(12) United States Patent
Fung et al.

(10) Patent No.: US 10,898,029 B2
(45) Date of Patent: Jan. 26, 2021

(54) SMOKE REDUCTION SYSTEM FOR A COOKING APPLIANCE

(71) Applicants: Kam Fai Fung, Hong Kong (CN); Kin Man Lai, Hong Kong (CN)

(72) Inventors: Kam Fai Fung, Hong Kong (CN); Kin Man Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 291 days.

(21) Appl. No.: 13/957,975

(22) Filed: Aug. 2, 2013

(65) Prior Publication Data
US 2015/0033954 A1    Feb. 5, 2015

(51) Int. Cl.
*A47J 37/00* (2006.01)
*A47J 37/06* (2006.01)

(52) U.S. Cl.
CPC .... *A47J 37/0611* (2013.01); *A47J 2037/0617* (2013.01)

(58) Field of Classification Search
CPC ............... A47J 37/0611; A47J 2037/0617
USPC ............................ 99/375, 372, 400, 445, 446
See application file for complete search history.

(56) References Cited

U.S. PATENT DOCUMENTS

| | | | |
|---|---|---|---|
| 2,033,060 A | 3/1936 | Anderson | |
| 2,057,501 A | 10/1936 | Parr | |
| 2,607,287 A | 8/1952 | Price | |
| 2,719,903 A | 10/1955 | Oertli | |
| 3,199,438 A * | 8/1965 | Myler et al. | 99/421 R |
| 4,011,431 A * | 3/1977 | Levin | 219/524 |
| 4,036,995 A | 7/1977 | Koether et al. | |
| 4,088,067 A | 5/1978 | Kaebitzsch et al. | |
| 4,206,345 A | 6/1980 | Maass et al. | |
| 4,697,504 A | 10/1987 | Keating | |
| 4,917,006 A * | 4/1990 | Bowen | A47J 37/0676 126/39 G |
| 4,979,440 A * | 12/1990 | Latour et al. | 99/445 |
| 5,105,725 A * | 4/1992 | Haglund | 99/446 |
| 5,237,914 A | 8/1993 | Carstensen | |
| 5,467,696 A | 11/1995 | Everhart | |
| 5,531,155 A | 7/1996 | Pellicane et al. | |
| 5,546,851 A * | 8/1996 | Goto | A47J 37/0676 99/446 |
| 5,712,466 A | 1/1998 | Spicer | |
| 5,758,568 A | 6/1998 | Moravec | |
| 5,848,567 A | 12/1998 | Chiang | |
| 5,992,302 A | 11/1999 | Geisler | |
| 6,062,130 A | 5/2000 | Brady | |
| D436,498 S | 1/2001 | Carlson et al. | |
| 6,389,959 B1 * | 5/2002 | Robertson | 99/331 |
| 6,439,108 B1 | 8/2002 | Wu | |
| 6,484,624 B1 * | 11/2002 | Wu | A47J 37/0611 99/339 |
| RE37,988 E | 2/2003 | Uss | |
| 6,539,842 B1 | 4/2003 | Chapman et al. | |
| 6,591,740 B1 | 7/2003 | Hsu | |

(Continued)

*Primary Examiner* — Reginald Alexander
(74) *Attorney, Agent, or Firm* — Grogan, Tuccillo & Vanderleeden, LLP

(57) ABSTRACT

A cooking appliance includes an upper housing having a first heating surface and a lower housing operatively connected to the upper housing. The lower housing has a second heating surface having a plurality of apertures therethrough for facilitating the egress of cooking juices from the second heating surface.

13 Claims, 5 Drawing Sheets

(56) References Cited

U.S. PATENT DOCUMENTS

| | | |
|---|---|---|
| 6,595,116 B1 | 7/2003 | Lin |
| 6,705,306 B1 | 3/2004 | Dickey |
| 7,514,655 B2 | 4/2009 | Fernandez et al. |
| 7,608,803 B2 | 10/2009 | Jerovsek |
| 7,717,028 B2 | 5/2010 | Serra |
| 8,122,816 B2 | 2/2012 | Yu |
| 8,261,657 B2 | 9/2012 | Serra et al. |
| 8,631,739 B2 * | 1/2014 | Reischmann ....... A47J 37/0676 99/444 |
| 2004/0074398 A1 | 4/2004 | Griffin et al. |
| 2005/0139086 A1 | 6/2005 | McHutchison |
| 2009/0165774 A1 | 7/2009 | Johnston et al. |
| 2010/0300305 A1* | 12/2010 | Schon ............................. 99/375 |
| 2011/0011277 A1* | 1/2011 | Bond ............................. 99/375 |
| 2012/0137897 A1 | 6/2012 | Tahincioglu |

* cited by examiner

SMOKE REDUCTION SYSTEM FOR A COOKING APPLIANCE

FIELD OF THE INVENTION

The present invention relates to cooking appliances and, more particularly, to a smoke reduction system for a cooking appliance.

BACKGROUND OF THE INVENTION

Cooking appliances, and in particular electric cooking/grilling devices such as griddles, are known. One type of known grilling devices typically evidences a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of convenience and cleanliness. As will be readily appreciated, during cooking, oil or other cooking juices from a food item tend to accumulate on the hot cooking surfaces of existing grills, which generates objectionable smoke and foul odors as the oils are heated. Accordingly, there is a need for a cooking appliance that reduces smoke and associated foul odors during the cooking or heating process.

SUMMARY OF THE INVENTION

It is an object of the present invention to provide a cooking appliance having a smoke reduction system.

It is another object of the present invention to provide a cooking appliance having a smoke reduction system that also reduces the prevalence of foul odors.

These and other objects are achieved by the present invention.

According to an embodiment of the present invention, a cooking appliance includes an upper housing having a first heating surface and a lower housing operatively connected to the upper housing. The lower housing has a second heating surface having a plurality of apertures therethrough for facilitating the egress of cooking juices from the second heating surface.

According to another embodiment of the present invention a cooking appliance includes a housing having a heating plate for contacting a food item to be heated. The heating plate includes a plurality of apertures formed therethrough for facilitating the egress of liquid. The cooking appliance also includes a colleting tray beneath said heating plate for collecting the liquid.

According to another embodiment of the present invention a smoke reduction system for a cooking appliance having an upper housing having an upper heating surface and a lower housing having a lower heating surface is provided. The smoke reduction system includes a plurality of apertures formed in the lower heating surface. The apertures provide a means of egress for fluids from the lower heating surface.

According to another embodiment of the present invention a method of reducing smoke and associated odors in a cooking appliance having an upper heating surface and a lower heating surface is provided. The method includes the steps of operatively connecting the first heating surface with the second heating surface such that the first heating surface is positioned in opposition to the second heating surface, and forming apertures in one of the first heating surface and the second heating surface. The apertures provide an egress for fluids from one of the first heating surface and the second heating surface.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
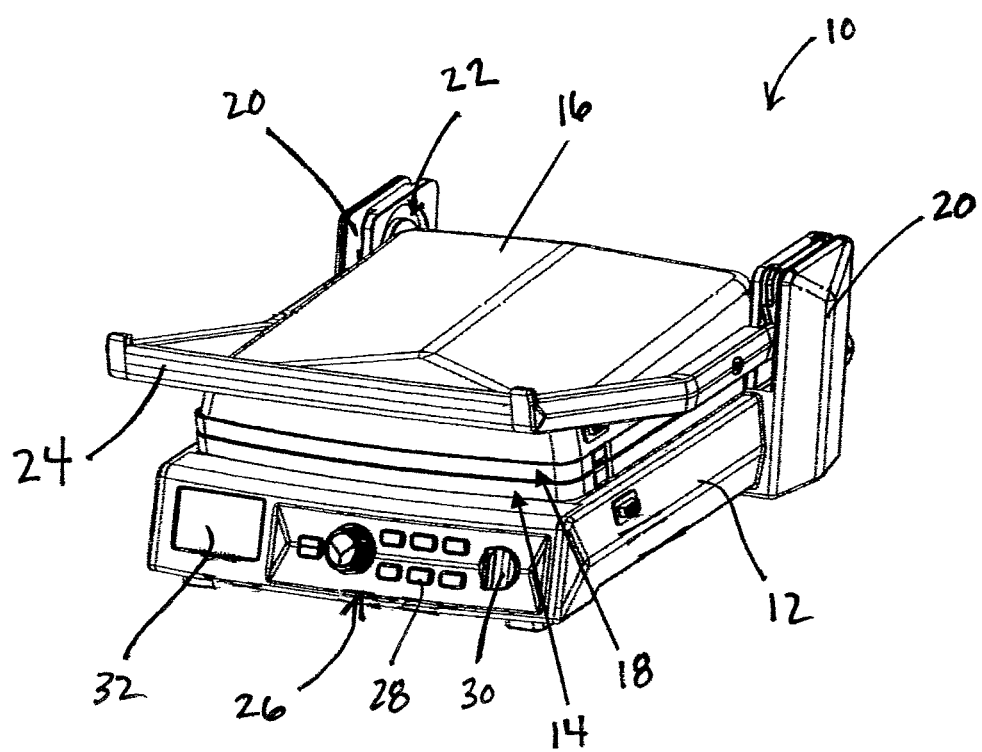
FIG. 1 is a perspective view of a cooking appliance according to an embodiment of the present invention, illustrating the cooking appliance in a closed position.
Figure 2:
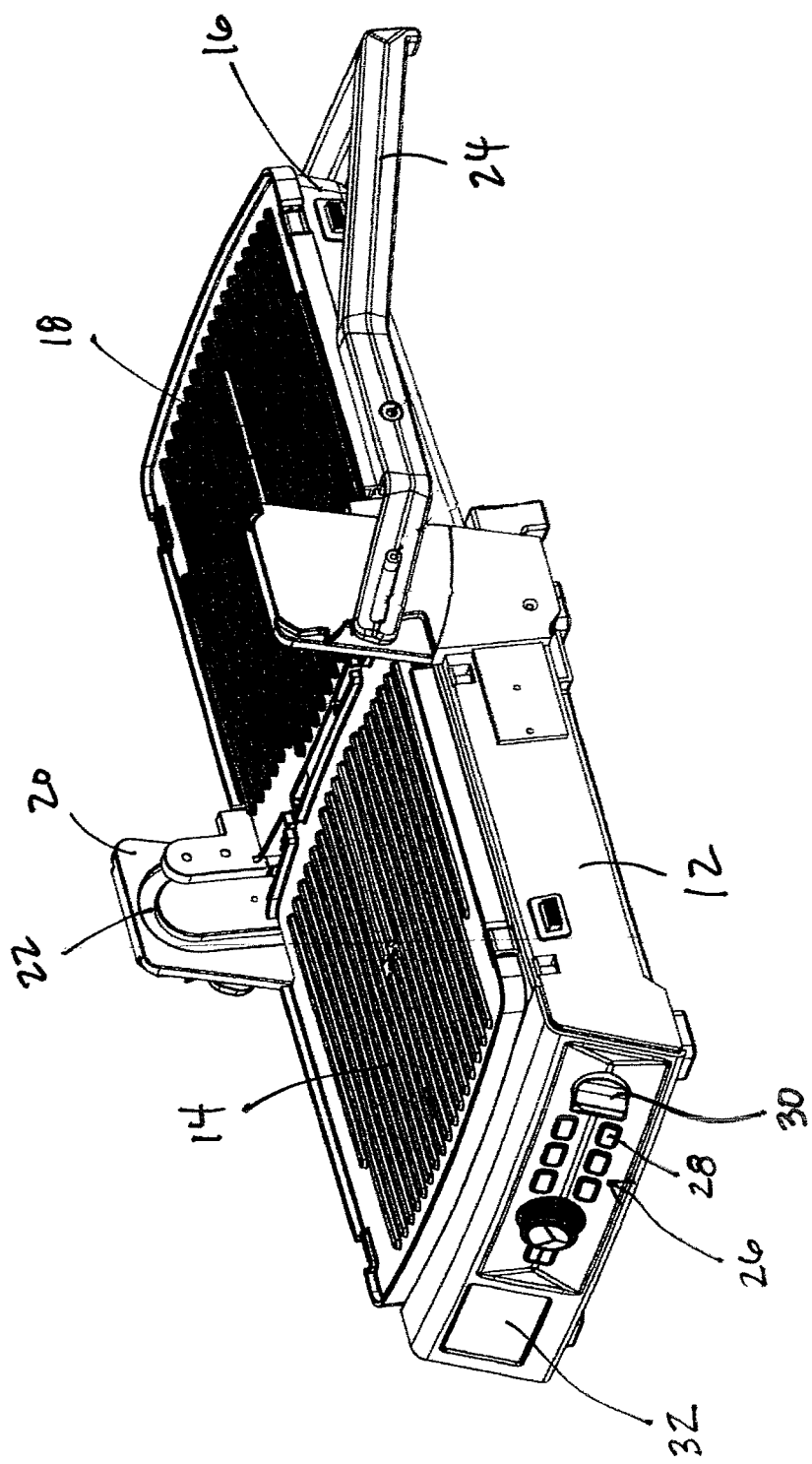
FIG. 2 is a perspective view of the cooking appliance of FIG. 1, illustrating the cooking appliance in an open position.

Referring to FIGS. 1 and 2, a cooking appliance 10 according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18. The upper housing 16 is operatively connected to the lower housing 12 via opposed frame members 20 extending from the lower housing 16. In particular, as shown therein, the upper housing 16 rides in a guide track 22 in the frame members 20. A handle 24 attached to the upper housing 16 allows a user to raise and lower the upper housing 16 in the guide track 22 in order to selectively position the upper housing 16 in various positions in relation to the lower housing 12. FIG. 1 illustrates the cooking appliance 10 in a closed position, while FIG. 2 illustrates the cooking appliance 10 in a fully open position.

As further shown in FIGS. 1 and 2, the cooking appliance 10 includes a control panel 26 having an array of buttons 28 and rotatable knobs 30 that allow a user to select and set a variety of cooking and heating parameters, and an LCD screen 32 that allows a user to view the parameters being set, as well as to monitor the cooking process.

Figure 3:
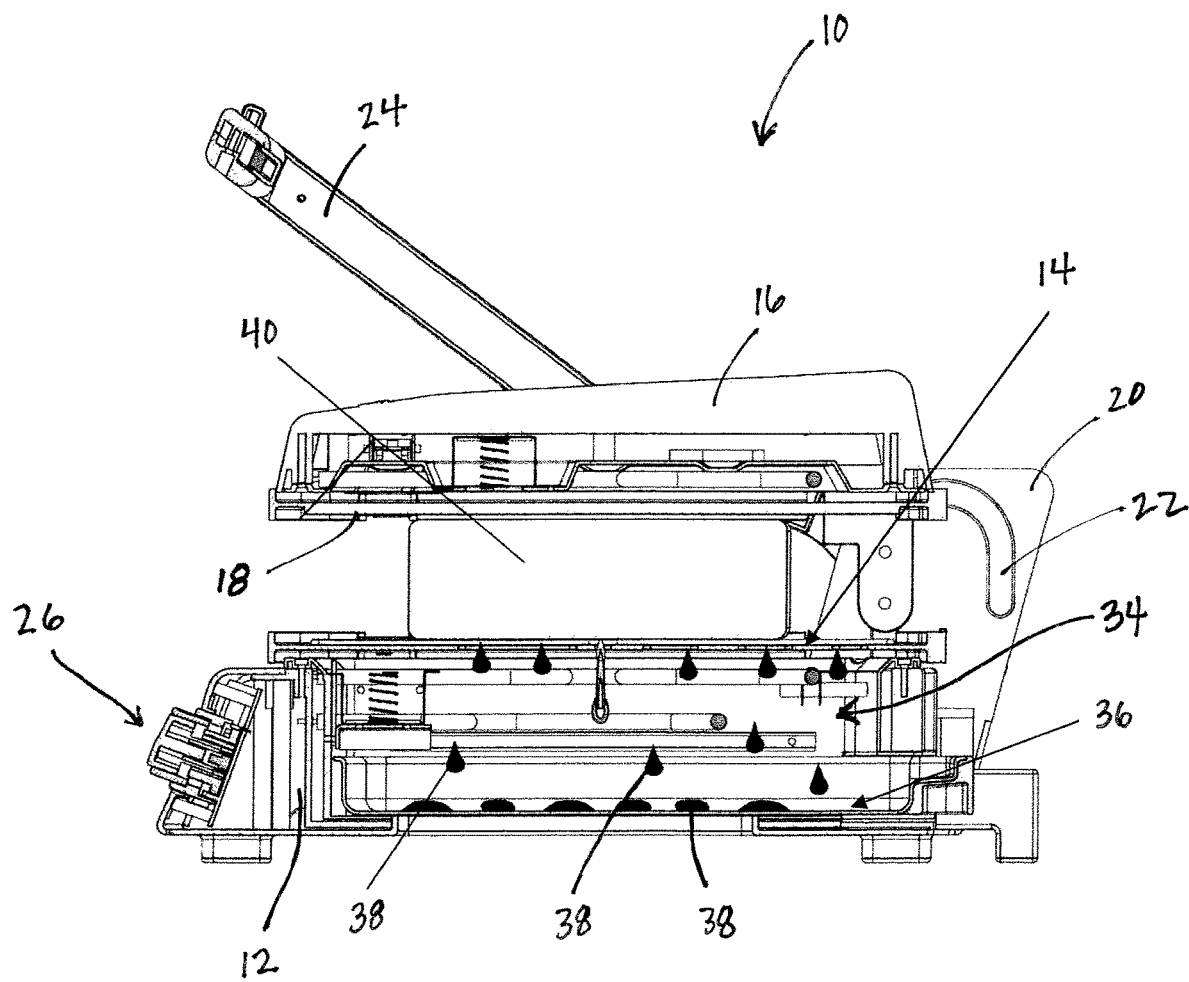
FIG. 3 is a side, cross-sectional view of the cooking appliance of FIG. 1.

With reference to FIG. 3, the cooking appliance 10 also includes a smoke reduction system 34 that includes the lower heating surface 14 and a collecting tray 36 that is slidably received in the lower housing 12 beneath the lower heating surface 14. As discussed in detail hereinafter, the smoke reduction system 34 prevents oil 38 or run-off of cooking juices and the like of a food item 40 from accumulating on the lower heating surface 14, which tends to generate smoke and foul odors as the oils 38 are heated.

Figure 4:
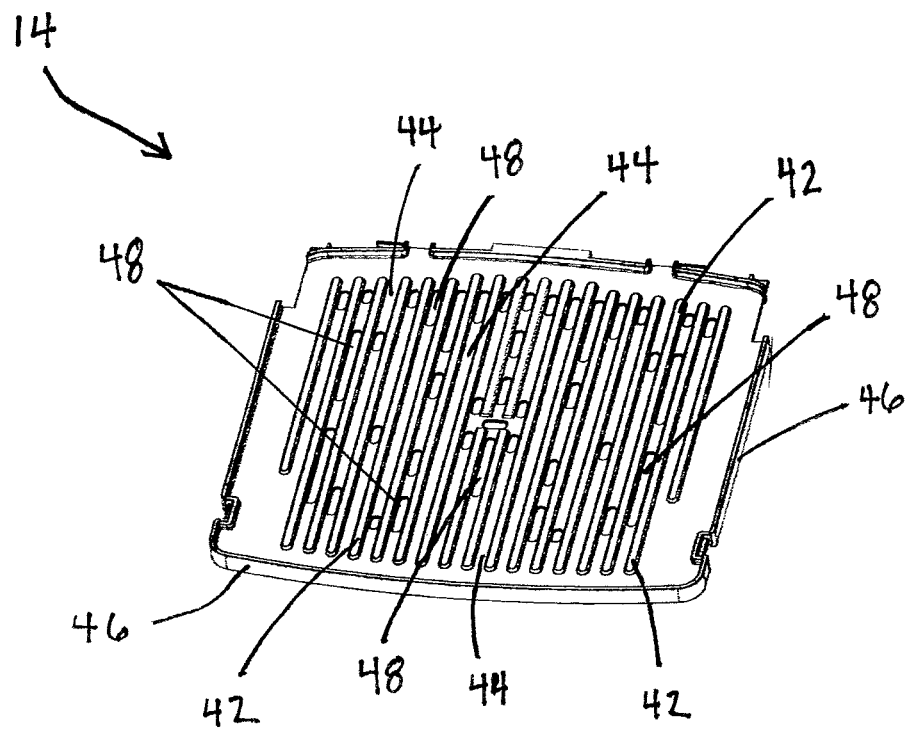
FIG. 4 is a perspective view of a lower heating surface of the cooking appliance of FIG. 1.

Turning now to FIG. 4, the configuration of the lower heating surface 14 of the cooking appliance 10 is shown. Importantly, the lower heating surface 14 exhibits a generally corrugated configuration, having a plurality of parallel ridges 42 and furrows 44. The lower heating surface 14 also includes raised sidewalls 46 that substantially surround an outer periphery of the heating surface 14. As further shown therein, a plurality of slots or apertures 48 extend through the heating surface 14 in the area of the furrows 44. As also shown in FIG. 4, the apertures 48 may be of differing sizes, and are located within each of the furrows 44.

As will be readily appreciated, the apertures 48 in the lower heating surface 48 provide a manner of egress for the oils 38 and cooking juices of a food item 40. In particular, as oils 38 and cooking juices seep out of a food item during cooking, they enter the furrows 44 and drip through the heating surface 14 via the apertures 48 formed therein. Importantly, the oils 38 are thereby prevented from accumulating on the heating surface 48, which prevents them from being heated to their smoke point. In addition, the apertures 48 are positioned such that drippings will not contact the heating element (not shown) below the cooking surface 14. As a result, smoke and foul odors associated therewith are reduced.

Figure 5:
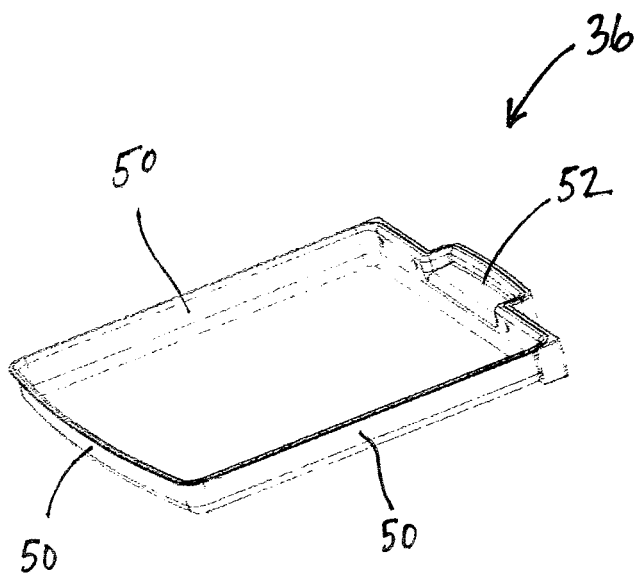
FIG. 5 is a perspective view of an oil collecting tray of the cooking appliance of FIG. 1.

As the oils 38 and other run-off of cooking juices drip through the lower heating surface 14, they are collected in the collecting tray 36. As shown in FIG. 5, the collecting tray 36 is generally rectangular in shape and has upstanding sidewalls 50. The collecting tray 50 also includes a handle 52 for allowing a user to insert and remove the collecting tray 36 from the cooking appliance 10.

Figure 6:
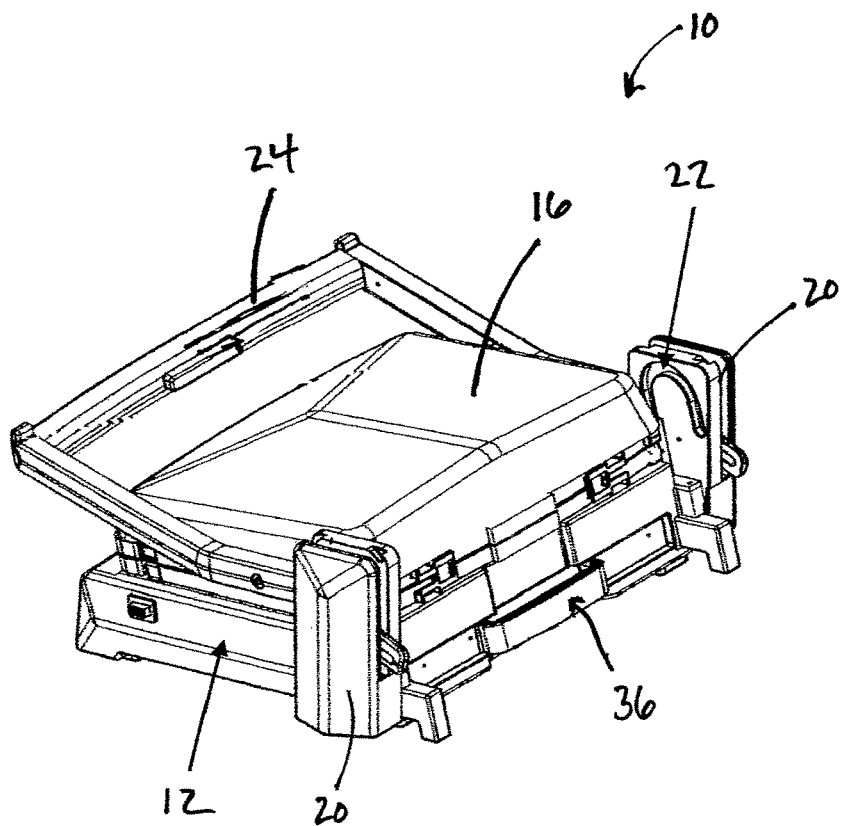
FIG. 6 is a rear perspective view of the cooking appliance of FIG. 1, illustrating the oil collecting tray in position beneath the lower heating surface.
Figure 7:
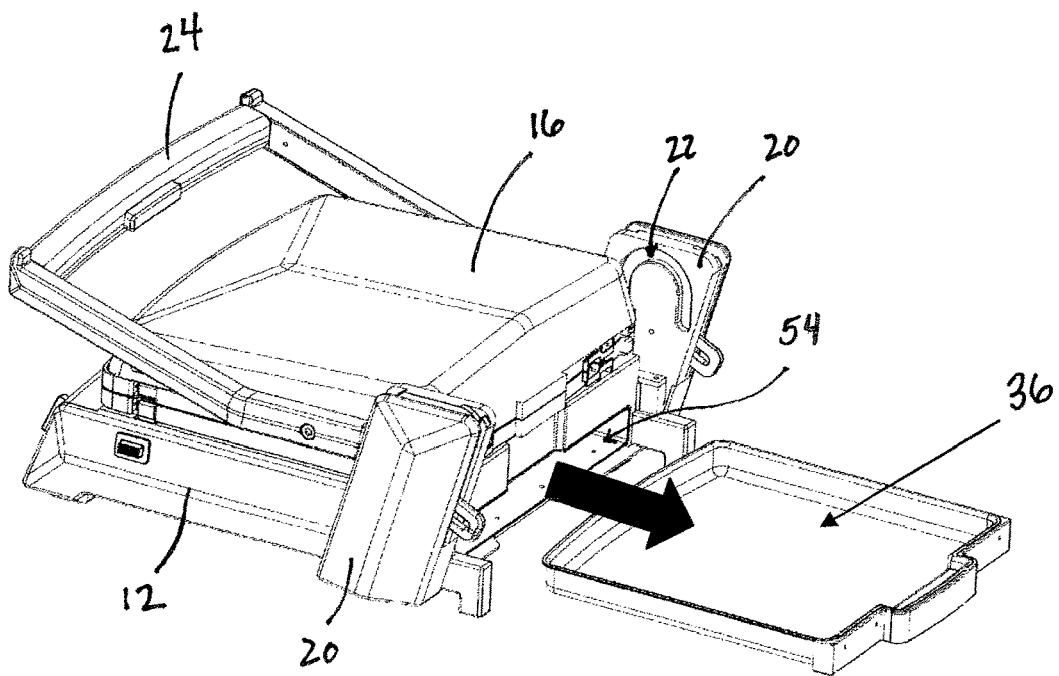
FIG. 7 is a rear perspective view of the cooking appliance of FIG. 1, illustrating removal of the oil collecting tray.

With reference to FIGS. 6 and 7, the collecting tray 36 is slidably received in an opening 54 in the lower housing 12 of the cooking appliance 10. In the installed position shown in FIG. 6, the collecting tray 36 is positioned beneath the lower cooking surface 14 to collect the run-off of cooking juices therefrom. As shown in FIG. 7, the collecting tray 36 may be removed from the cooking appliance 10 to allow for emptying and cleaning.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
   an upper housing having a first heating surface;
   a lower housing operatively connected to said upper housing, said lower housing having a second heating surface with a plurality of furrows;
   opposed frame members disposed between said upper housing and said lower housing and operatively receiving said upper housing via a guiding track;
   wherein said plurality of furrows of said second heating surface has a plurality of apertures of various sizes there through for facilitating the egress of cooking juices from said second heating surface;
   wherein said apertures are positioned to be horizontally offset from a heating element positioned below said second heating surface, and
   a control unit in communication with said first heating surface and said second heating surface;
   wherein said control unit selectively varying heating parameters of said first heating surface and said second heating surface;
   wherein said first heating surface is substantially parallel to said second heating surface.

2. The cooking appliance of claim 1, wherein:
   said second heating surface has a generally corrugated configuration.

3. The cooking appliance of claim 2, wherein:
   said second heating surface has a plurality of substantially parallel ridges between said furrows.

4. The cooking appliance of claim 1, wherein:
   said apertures are elongated slots.

5. The cooking appliance of claim 1, wherein:
   said second heating surface has upstanding lateral sidewalls.

6. The cooking appliance of claim 1, further comprising:
   a collecting tray slidably received in said lower housing and positionable beneath said second heating surface.

7. A smoke reduction system for a cooking appliance having an upper housing having an upper heating surface and a lower housing having a lower heating surface, said smoke reduction system comprising:
   a plurality of apertures of various sizes formed in a plurality of furrows of said lower heating surface, said plurality of apertures providing a means of egress for fluids from said lower heating surface; and
   a control unit in communication with said upper heating surface and said lower heating surface, said control unit selectively varying heating parameters of said upper heating plate and said lower heating plate,
   wherein said apertures are positioned horizontally offset a heating element positioned below said lower heating surface;
   wherein said upper heating surface is substantially parallel to said lower heating surface.

8. The smoke reduction system for a cooking appliance of claim 7, further comprising:
   a collecting tray slidably received in said lower housing and positionable beneath said lower heating surface.

9. The smoke reduction system for a cooking appliance of claim 7, wherein:
   said heating surface has a generally corrugated configuration.

10. The smoke reduction system for a cooking appliance of claim 9, wherein:
    said heating surface has a plurality of substantially parallel ridges and furrows.

11. The smoke reduction system for a cooking appliance of claim 10, wherein:
    said apertures are formed in said heating surface in an area of said furrows.

12. The smoke reduction system for a cooking appliance of claim 7, wherein:
    said apertures are elongated slots.

13. A cooking appliance, comprising:
    an upper housing having a first heating surface;
    a lower housing operatively connected to said upper housing and having a second heating surface, said first heating surface and said second heating surface being selectively heated to a predetermined temperature;
    wherein second heating surface has a plurality of apertures of differing sizes formed in each of a plurality of furrows therethrough for facilitating the egress of cooking juices from said second heating surface; and wherein said apertures are positioned to be horizontally offset from a heating element positioned below said second heating surface, so as to prevent the cooking juices from contacting said heating element;
wherein said first heating surface is substantially parallel to said second heating surface.

\* \* \* \* \*